United States Patent [19]

Strehl

[11] Patent Number: 4,914,745
[45] Date of Patent: Apr. 3, 1990

[54] METHOD OF CORRECTING IMAGE ERRORS

[75] Inventor: Herbert Strehl, Munich, Fed. Rep. of Germany

[73] Assignee: Siemens Aktiengesellschaft, Berlin and Munich, Fed. Rep. of Germany

[21] Appl. No.: 218,582

[22] Filed: Jul. 12, 1988

Related U.S. Application Data

[63] Continuation of Ser. No. 820,783, Jan. 22, 1986, abandoned.

[30] Foreign Application Priority Data

Jan. 24, 1985 [DE] Fed. Rep. of Germany ....... 3502317

[51] Int. Cl.$^4$ ............................................. H04N 5/21
[52] U.S. Cl. .................................... 358/166; 358/25; 358/37; 382/57
[58] Field of Search .................. 358/166, 37, 160, 13, 358/21 R, 23, 25, 105, 284; 382/57, 54

[56] References Cited

U.S. PATENT DOCUMENTS

| | | | |
|---|---|---|---|
| 4,403,250 | 9/1983 | Kellar | 358/105 |
| 4,626,891 | 12/1986 | Achiha | 358/21 R |
| 4,651,211 | 3/1987 | Weckenbrock | 358/166 |

OTHER PUBLICATIONS

"Techniques for Reducing the Visibility of Transmission Errors in Digitally Encoded Video Signals", Connor, IEEE Trans. on Comm., vol. COM—21, No. 6, Jun. 1973, pp. 695–706.

"Digitale Magnetbandaufzeichnung von Video-und Audiosignalen auf einem Videocaassetten-recorder", Westerkamp et al., 10 Jahrestagung der FKTG, 9/1982, pp. 526–548.

Primary Examiner—Tommy P. Chin
Attorney, Agent, or Firm—Hill, Van Santen, Steadman & Simpson

[57] ABSTRACT

A method for correcting image errors in the transmission of DPCM coded image signals provides that an error trail recognition is carried out at the receiving end and that the adulterated image signal values are replaced by already received and intermediately stored image signal values of the preceding television image or television half image.

13 Claims, 2 Drawing Sheets

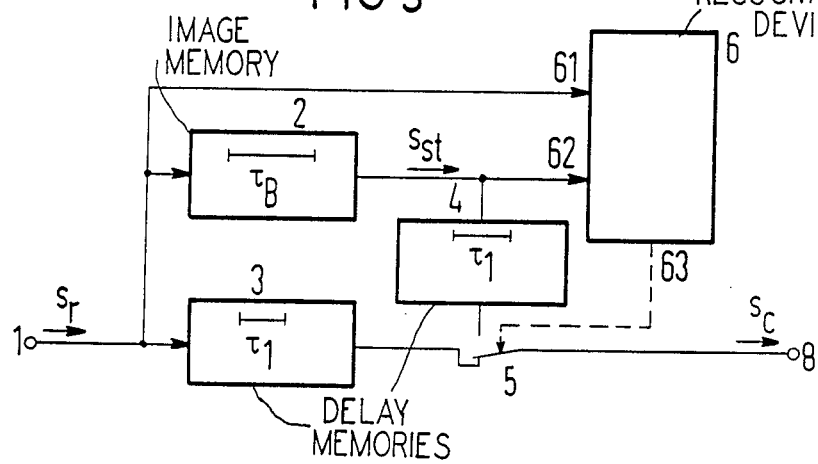

METHOD OF CORRECTING IMAGE ERRORS

This is a continuation of application Ser. No. 820,783, filed Jan. 22, 1986, abandoned.

BACKGROUND OF THE INVENTION

1. Field of the Invention

The present invention relates to a method of correcting image errors in the transmission of difference pulse code modulated (DPCM) coded image signals.

2. Description of the Prior Art

In the transmission of image signals, two fundamental methods are known for correcting image errors. in the first method, error-correcting codes are used to reduce transmission errors. However, these codes require a proportion of more than 5% of the transmission capacity. In the case of the second method, so-called image error masking is used. For this purpose, it is merely necessary to recognize a transmission error and to replace the adulterated image signal values by correction values which have been obtained from a preceding television image or by interpolation from the surrounding image signal values.

If image signals are transmitted by difference pulse code modulation, the adulteration of a single DPCM value is sufficient to produce a so-called error trail which adulterates the television image to a substantially greater extent than individual adulterated image signal values in the case of pulse code modulation (PCM) coding.

SUMMARY OF THE INVENTION

The object of the present invention is to provide a redundancy-free method of correcting image errors in DPCM coded image signal values.

The above object is achieved, according to the present invention, in the transmission of DPCM coded image signals in that an error trail recognition is carried out at the receiving end, and that adulterated image signal values are replaced by already received and intermediately stored image signal values of a preceding television image or television half image.

The present invention is based on the recognition that in the event of a transmission error, the resultant error trail will possess a specific geometric structure depending upon the prediction algorithm and the magnitude of the errors of the individual image signal values is also governed by the prediction algorithm. The typical error structure is determined by a comparison with the last received television image. In the conventional half image method, a comparison can be made with the corresponding half image of the last television image or, with a slight cut-off, with the last received half image. When an error is recognized, the adulterated image signal values are replaced by the intermediately stored image signal values. It is also possible, in particular in the case of the half image method, to use correction values which have been obtained and intermediately stored as a result of the interpolation of the image signal values of two consecutive lines.

The error trail recognition and correction can naturally also take place prior to the reconversion into PCM signal values, which is, in fact, equivalent to an integration process described by the prediction algorithm, by carrying out a comparison of the DPCM signal values and by correcting the adulterated DPCM signal value. This method requires a lower circuit expense.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a symbolic representation of a portion of a television image;

FIG. 2 is a symbolic representation of the fundamental structure of an error trail;

FIG. 3 is a schematic circuit diagram of a correcting device;

DESCRIPTION OF THE PREFERRED EMBODIMENTS

Figure 4:
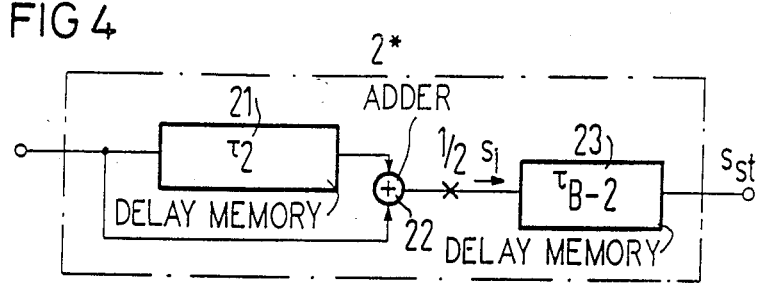
FIG. 4 is a schematic diagram of a circuit variation of the structure of FIG. 3.

FIG. 1 represents a portion of a television image. The individual crosses X and letters each correspond to an image signal value. In the coding, in a manner known per se, from the signal values which surround a current image signal value x, here A, B, C and D, a prediction value $x = a \times A + b \times B + c \times C + d \times D$ is calculated, which is compared with the current image signal value X. The difference is then transmitted as a DPCM signal value $\Delta s$. By a similar procedure, at the receiving end the PCM signal values are regained from the already reconstructed signal values $A_r$, $B_r$, $C_r$, $D_r$ and the corresponding DPCM signal value $\Delta s$.

As can be seen from FIG. 2, in the event of the adulteration of one or more of the higher-value bits of a DPCM signal value $\Delta s$, an error trail Z1 occurs, whose boundaries, on the basis of the above prediction algorithm, considered from the adulterated signal Y, extend horizontally towards the end of the line and approximately diagonally towards the lower left. A clearly visible core zone Z1 with heavily adulterated image signal values here extends from the first adulterated image signal value Y approximately diagonally towards the lower right. here, the intensity of the adulterations generally decreases rapidly in accordance with the distance from the first adulterated image signal value. If the prediction is based on positive factors a, b, c and d, then the errors in the image signal values will also relate to the same direction, i.e. all the image points affected by the error will become uniformly lighter or darker.

The correcting device illustrated in FIG. 3 is supplied via an input 1 with the reconstructed image signal values $s_r$ (PCM values). A first input 61 of an error trail recognition device 6 is directly connected to the input 1, whereas a second input 62 of the error trail recognition device 6 is connected via an image memory 2 to the input 1. The input 1 is also connected via a first delay memory 3 to an input of a transfer switch 5 from whose output 8 the corrected image signal values $s_c$ are emitted. The output of the image memory is also connected via a second delay memory 4, which has the same delay time $\tau_1$ as the first delay memory 3, to the second input of the transfer switch 5. The transfer switch 5 is controlled via a control output 63 of the error trail recognition device 6.

It will first be assumed that the delay time of the image memory 2 corresponds to that of one complete television image. Therefore, the image signal values, which correspond to one another, of two consecutive television images occur at the two inputs 61 and 62 of the error trail recognition device. Since the geometric structure of the error trail is known on the basis of the prediction method which is used, the error trail recognition device 6 is easily able to locate errors. In order to avoid wrong decisions, those image signal values which are not affected by an error are also evaluated in order to avoid the simulation of an error trail due to a change in the image motif. If, however, an error trail has been definitely recognized, the transfer switch is switched from the position shown in FIG. 3 to the output of the second delay memory 4. As a result, the adulterated image signal values are replaced by the unadulterated image signal values of the preceding television image. The delay time of the delay memories 3 and 4 corresponds to the processing time of the error trail recognition device 6. Depending upon the circuitry expense, the error trail recognition device 6 can replace the adulterated signal values, only the adulterated signal values of the core zone Z1, or entire television lines or the entire television image or television half image.

In most cases it is sufficient that the delay time of the image memory 2 should correspond to the duration of a television half image as generally the image signal values of consecutive television lines differ only slightly from one another. An improvement in the image quality is achieved by interpolation effected in a particularly simple manner by the use of an image memory 2* as shown in FIG. 4. This image memory contains a delay component 21 which has a delay time $\tau_2$ of one television line. The input and the output of this delay component are connected via an adder 22 to the input of a further delay component 23 whose delay time $\tau_{B-2}$ corresponds to the duration of the television image except for one television line.

Two image signal values, located one above another, of two consecutive television lines are linearly interpolated, whereupon they are input, as an interpolation value $s_i$ into the delay memory 23. here the factor $\frac{1}{2}$ is obtained by appropriate connections between the output of the adder 22 and the input of the delay component 23. Naturally, a more elaborate interpolation can also be carried out in a simple manner in order to determine the estimated value.

In a practical embodiment, the first delay memory 3 advantageously represents a portion of the image memory 2. It is also advantageous that unadulterated correction values, i.e. the already stored image signal value $s_{st}$, should be reinput into the image memory in place of the image signal values which have been recognized as being adulterated.

The error trail recognition device will first be explained in detail. Its construction will present one of ordinary skill in the art with far fewer difficulties than other problems of object or character recognition, since the geometric structure of the error trail is known as a result of the selected prediction method, all errors relate to the same direction, and the relationship between the magnitude of the errors in the various image signal values is also known.

Figure 5:
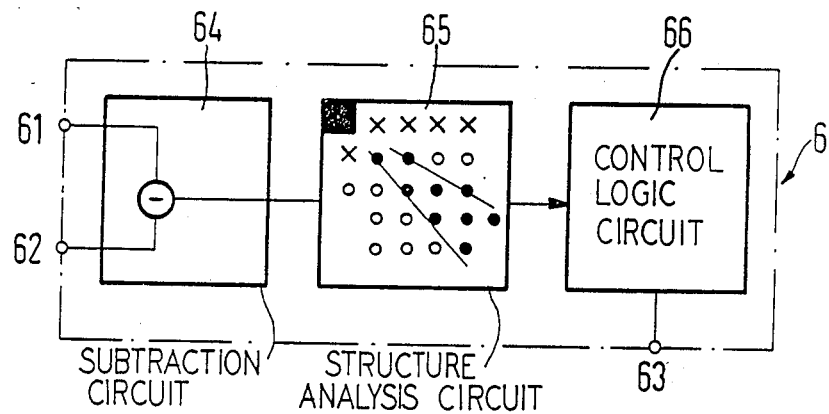
FIG. 5 is a schematic circuit diagram of an error trail recognition device.

The error trail recognition device shown in FIG. 5 contains a subtraction circuit 64 having a pair of inputs 61 and 62. The output of the subtraction circuit 64 is connected to a structure analysis circuit 65 which fundamentally comprises memories for a plurality of television lines. The output of the structure analysis circuit 65 is connected to an analysis and control logic circuit 66 which actuates the transfer switch 5 in FIG. 3 via the control output 63.

The difference between the image signal values of two consecutive television images is continuously input into the structure analysis structure. In order to recognize an error trail, in the simplest example it is only necessary to check the signs of the differences within the adulterated core zone Z1, advantageously assisted by a comparison between the differences of unadulterated signal values. If two comparisons prove to be positive, i.e. all the signs of the differences within the error trail are identical and the differences outside the error trail are equal or approximately equal to zero, then, for example, the adulterated television lines are replaced by unadulterated television lines. Numerous variants are required for the structure analysis circuit. For example, it is not necessary to intermediately store the differences for all the television lines, and it is also possible to carry out signal processing where consecutively only one difference between the image signal values within the adulterated core zone in the calculating is checked.

Figure 6:
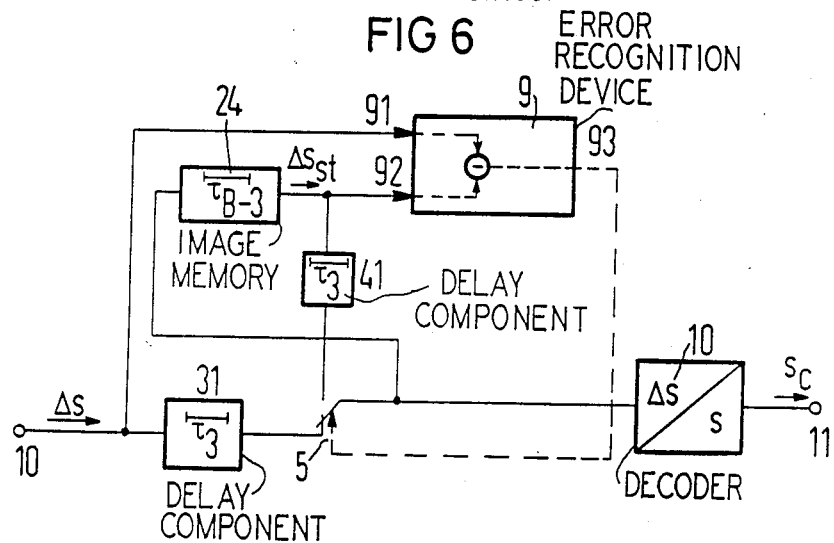
FIG. 6 is a schematic circuit diagram of a correcting device for DPCM signal values.

FIG. 6 illustrates a correcting device which is supplied with DPCM signal values $\Delta s$ and which replaces adulterated DPCM signal values by unadulterated, intermediately stored DPCM signal values. The input 10 of this correcting device is directly connected to a first input 91 of an error recognition device 9 and is connected via a delay component 31, a transfer switch 5, and an image memory 24 to a second input 92 of the error recognition device 9. The output of the image memory 24 is also connected via a delay component 41 to a second input of the transfer switch 5, whose output is connected to DPCM decoder 10 having an output 11 which provides the corrected image signal value $s_c$. The transfer switch 5 is actuated via the control output 93 of the error recognition device 9.

The operation of the correcting arrangement shown in FIG. 6 largely corresponds to that of the correcting arrangement shown in FIG. 3. Here, however, the DPCM signal values $\Delta s$ of consecutive television images or television half images are directly compared with one another and when an adulterated DPCM signal value is noticed, this is replaced by an intermediately stored correction value from the image memory 24. The delay time $\tau_3$ of the delay components 31 and 41 again correspond to the processing time of the error recognition device 9. As already described above, in place of an adulterated DPCM signal value, the DPCM signal value $\Delta s_{st}$ which is intermediately stored in the image memory 24, is reinput into the image memory 24 via the transfer switch 5. The delay $\tau_{B-3}$ (or storage capacity) of the image memory 24 corresponds, except for the transit time $\tau_3$, to the duration of one television image or half image. The error recognition device can be constructed in a more simple manner than the error trail recognition device. In the event of one single deviation between the DPCM values of two consecutive television images or half images when the adjoining DPCM signal values remain uniform, it can be assumed with a high level of certainty that a transmission error exists and a correction can be effected by the use of the appropriate intermediately stored DPCM value. The signal values which follow the adulterated DPCM value y and the DPCM signal value below y should also be checked as adjacent DPCM values. It is also possible to carry out an interpolation of the DPCM values and to intermediately store these in accordance with the interpolation for image signal values.

Disregarding circuitry expense, it is immaterial whether the correction is carried out in the PCM or DPCM level since the DPCM signal values represent, as it were, a derivation of the image signal values. Depending upon the possibility of error occurrence, a correction of either the DPCM signal values or the image signal values will be carried out. Naturally, it is likewise possible to combine error recognition by checking the image signal values and correction of the DPCM signal values and vice-versa.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of correcting image errors in a transmission of difference pulse code modulated image signal values comprising a television picture, said method comprising the steps of:
    at a receiver, receiving said difference pulse code modulated image signal values, reconstructing regained image signal values from the received difference pulse code modulated image signal values, said regained image signal values including adulterated image signal values caused by adulteration of some of said difference pulse code modulated image signal values during transmission, and storing the regained image signal values of at least a half image;
    recognizing error trails in at least said half image of stored regained image signal values, said error trails consisting of adulterated image signal values; and
    replacing said adulterated image signal values in said error trail with other stored reconstructed image signal values.

2. The method of claim 1, wherein said received difference pulse code modulated image signal values comprise a current television picture, wherein difference pulse code modulated image signal values comprising a preceding television picture have already been received and regained image signal values obtained therefrom, and wherein the step of recognizing error trails is defined as:
    intermediately storing said regained image signal values from at least a half image of said preceding television picture; and
    comparing said received regained image signal values for said current television picture with corresponding ones of said intermediately stored regained image signal values of said preceding television at least half image.

3. The method of claim 1, wherein said received difference pulse code modulation image signal values include unadulterated difference pulse code modulation image signal values as well as said adulterated difference pulse code modulation image signal values, and further comprising the steps of:
    intermediately storing said unadulterated difference pulse code modulation image signal values; and
    applying said intermediately stored difference pulse code modulation image signal values to a difference pulse code modulation decoder in place of said adulterated difference pulse code modulation image signal values.

4. The method of claim 1, and further comprising the steps of:
    storing difference pulse code modulation image signal values of a preceding television at least half image in place of an adulterated difference pulse code modulation image signal value.

5. The method of claim 1, and further comprising the step of:
    storing image signal values of a preceding television at least half image in place of adulterated image signal values.

6. The method of claim 1, wherein said received difference pulse code modulation signal values comprise a complete current television image, and wherein a preceding complete television image has already been transmitted, and wherein the step of replacing is further defined as:
    intermediately storing said preceding complete television image; and
    replacing current complete television image by said intermediately stored complete television image.

7. The method of claim 1, wherein said difference pulse code modulated image signal values comprise a current half image, and wherein a preceding half image has already been transmitted, and wherein the step of replacing is further defined as:
    intermediately storing said preceding half image; and
    replacing said current half image with said intermediately stored half image.

8. The method of claim 1, wherein the step of recognizing said error trails and the step of replacing said adulterated image signal values are further defined as:
    comparing adulterated image signal values in an error trail with previously stored reconstructed image signal values of corresponding picture elements and replacing said adulterated image signal values only when the image signal values of an error trail are at least virtually unchanged.

9. The method of claim 1, and further comprising the steps of:
    obtaining interpolation values from two successive television lines for comparing the adulterated image signal values in an error trail with stored image signal values of a preceding television half image, and storing the interpolated values as image signal values.

10. The method of claim 9, wherein each error trail includes more heavily adulterated image signal values in a core zone of the error trail, and further defined as:
    identifying said more heavily adulterated image signal values in each error trail; and
    replacing only the more heavily adulterated image signal values within a core zone of each error trail.

11. The method of claim 9, wherein the step of replacing is further defined as:
    correcting said received adulterated image signal values line-by-line.

12. The method of claim 1, wherein said received difference pulse code modulated image signal values comprise a current television picture, and wherein difference pulse code modulated image signal values of a preceding television picture have already been received, and wherein the step of recognizing error trails is further defined as:
  storing received difference pulse code modulated image signal values of said preceding television picture; and
  comparing said received difference pulse code modulated image signal values for said current television picture with said stored difference pulse code modulated image signal values of said preceding television picture.

13. The method of claim 1, wherein the step of recognizing error trails is further defined as:
  interpolating a television at least half image to obtain difference pulse code modulated image signal values and storing the same; and
  comparing said received difference pulse code modulation image signal values with said stored interpolated difference pulse code modulation image signal values of a preceding half image.

* * * * *